US006931107B2

(12) United States Patent
Contractor

(10) Patent No.: US 6,931,107 B2
(45) Date of Patent: *Aug. 16, 2005

(54) SYSTEMS AND METHODS FOR PER USE BUSY MESSAGE

(75) Inventor: Sunil Contractor, Marietta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 113 days.

This patent is subject to a terminal disclaimer.

(21) Appl. No.: 09/734,818

(22) Filed: Dec. 12, 2000

(65) Prior Publication Data

US 2002/0101963 A1 Aug. 1, 2002

(51) Int. Cl.$^7$ ............................................... H04M 1/64
(52) U.S. Cl. ............................. 379/88.25; 379/114.02; 379/221.09; 455/413; 704/275
(58) Field of Search .......................... 379/88.22, 88.23, 379/88.12, 67.1

(56) References Cited

U.S. PATENT DOCUMENTS

| | | | |
|---|---|---|---|
| 4,625,081 A | 11/1986 | Lotito et al. ................. 379/88 |
| 4,757,525 A | 7/1988 | Matthews et al. ............ 379/89 |
| 4,972,461 A | 11/1990 | Brown et al. ................ 379/67 |
| 5,185,782 A | 2/1993 | Srinivasan ................. 379/67.1 |
| 5,311,589 A | 5/1994 | Bennett et al. ............. 379/386 |
| 5,396,542 A | * 3/1995 | Alger et al. ............... 379/67.1 |
| 5,425,091 A | 6/1995 | Josephs ...................... 379/201 |
| 5,463,677 A | * 10/1995 | Bash et al. ............. 379/144.02 |
| 5,471,519 A | 11/1995 | Howe et al. ................. 379/67 |
| 5,475,737 A | * 12/1995 | Garner et al. .......... 379/207.09 |
| 5,610,969 A | 3/1997 | McHenry et al. ............. 379/56 |
| 5,701,301 A | 12/1997 | Weisser, Jr. ................ 370/428 |
| 5,742,905 A | 4/1998 | Pepe et al. .................. 455/461 |
| 5,778,052 A | * 7/1998 | Rubin et al. ........... 379/207.03 |
| 5,790,639 A | 8/1998 | Ranalli et al. ......... 379/100.08 |
| 5,797,124 A | * 8/1998 | Walsh et al. ............. 379/88.04 |
| 5,812,639 A | 9/1998 | Bartholomew et al. ....... 379/89 |
| 5,953,657 A | 9/1999 | Ghisler ...................... 455/417 |
| 5,956,390 A | 9/1999 | McKibben et al. ...... 379/93.07 |

(Continued)

FOREIGN PATENT DOCUMENTS

| | | |
|---|---|---|
| DE | 198 14 450 A1 | 10/1999 |
| EP | 0 905 959 A2 | 3/1999 |
| WO | WO 97 33421 A | 9/1997 |
| WO | WO 98/27712 | 6/1998 |
| WO | WO 98/43402 | 10/1998 |
| WO | WO 98/45383 | 10/1998 |
| WO | WO 00 70647 A | 11/2000 |

OTHER PUBLICATIONS

Neur E.I., "Personal Communication In Traditional Cellular Networks", Proceedings of the SPIE, SPIE, Bellingham, VA, vol. 2602, 1996, pp. 184–194.

Primary Examiner—Fan Tsang
Assistant Examiner—Ming Chow
(74) Attorney, Agent, or Firm—Woodcock Washburn LLP

(57) ABSTRACT

A calling party calls a called party and leaves a message on a voice messaging system after receiving a busy status if the calling party is willing to pay to leave a message and if the calling party has given permission to send messages. The calling party is connected with the voice messaging system responsive to a trigger in the telephone system. The voice messaging system receives and stores the message for future retrieval by the called party. The called party can then dial the messaging system to play the message. However, the called party does not establish the voice messaging system for his associated number, rather the calling party provides permission to send the message. An indicator may be provided to the called party alerting the called party to the waiting message. The called party then dials the voice messaging system and retrieves the stored message. Prompts may be provided to the calling party for message options.

48 Claims, 3 Drawing Sheets

U.S. PATENT DOCUMENTS

| | | |
|---|---|---|
| 5,963,864 A | 10/1999 | O'Neil et al. ................ 455/445 |
| 5,995,848 A | 11/1999 | Nguyen ....................... 455/528 |
| 6,014,377 A | 1/2000 | Gillespie .................... 370/351 |
| 6,055,302 A | 4/2000 | Schmersel et al. .......... 379/207 |
| 6,064,874 A | 5/2000 | Cox et al. ................... 455/404 |
| 6,160,878 A | 12/2000 | Hau et al. ................... 379/201 |
| 6,215,858 B1 | 4/2001 | Bartholomew et al. .. 379/88.17 |
| 6,240,174 B1 | 5/2001 | Silver ......................... 379/230 |
| 6,285,745 B1 | 9/2001 | Bartholomew et al. .. 379/88.17 |
| 6,317,594 B1 | 11/2001 | Gossman et al. ........... 455/414 |
| 6,397,055 B1 | 5/2002 | McHenry et al. ........... 455/408 |
| 6,411,704 B1 * | 6/2002 | Pelletier et al. ............. 370/352 |
| 6,418,306 B1 * | 7/2002 | McConnell ................. 455/413 |
| 6,442,250 B1 * | 8/2002 | Troen-Krasnow et al. ....................... 379/93.15 |
| 6,463,136 B1 | 10/2002 | Malik ......................... 379/111 |

* cited by examiner

SYSTEMS AND METHODS FOR PER USE BUSY MESSAGE

FIELD OF THE INVENTION

The present invention generally relates to the field of telecommunications and to systems and methods for managing telephony-based services. More particularly, the present invention relates to a voice messaging system that stores a message responsive to a calling party's directive after a busy status on a called line number, and subsequently plays the stored message for the called party when the called party calls the voice messaging system.

BACKGROUND OF THE INVENTION

Today, due to busy life and work environment, it is often difficult to reach a person on their telephone and many people still do not have answering machines or subscribe to voice messaging systems. If a called party does not have an answering machine or does not subscribe to a voice messaging service, it becomes difficult to leave a message for the called party.

Conventional voice messaging systems utilize a call forwarding feature to forward a call from a called number to a voice messaging system upon a busy status or a no answer status. In order to enable this call forwarding feature, telephone users pay a monthly fee to their local telephone service provider. The voice messaging system is typically under the control of the local telephone service provider. However, there is no system available to receive voice messages from a telephone service provider's voice messaging system without subscribing to the voice messaging service of the local telephone service provider.

In view of the foregoing, there is a need for systems and methods that overcome the limitations and drawbacks of conventional systems by allowing a calling party to leave a message on a voice messaging system, and having the called party dial the messaging system to play the message at a later time, even when the called party does not subscribe to a messaging system from the local telephone service provider.

SUMMARY OF THE PRESENT INVENTION

The present invention is directed to a calling party leaving a message on a voice messaging system and the called party dialing the messaging system to play the message at a later time if the calling party has given permission to send the message. The calling party is connected with the voice messaging system responsive to a trigger in the telephone system. The trigger responds to a busy status on the called line number. However, the called party does not establish the voice messaging system for his associated number, rather the calling party provides permission to send the message. The present invention may be implemented on an Advanced Intelligent Network (AIN) based wire line telephone system.

According to aspects of the invention, the calling party is prompted for, and a system receives, message options including reviewing the message, deleting the message, re-recording the message, and/or sending the message. Preferably, the prompt is audible voice notification. Preferably, the system receives message options through either telephone keypad entry or through voice recognition and processing techniques.

The above-listed features, as well as other features, of the present invention will be more fully set forth hereinafter.

BRIEF DESCRIPTION OF THE DRAWINGS

The present invention is further described in the detailed description that follows, by reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

The present invention is directed to a calling party leaving a message on a voice messaging system and the called party dialing the messaging system to play the message at a later time if the calling party has given permission to send the message. The calling party is connected with the voice messaging system responsive to a trigger in the telephone system. The trigger responds to a busy status on the called line number. However, the called party does not establish the voice messaging system for his associated number, rather the calling party provides permission to send the message. The present invention may be implemented on an Advanced Intelligent Network (AIN) based wire line telephone system.

AIN Overview

An AIN is a particular type of telephone system with intelligent devices that handle the messaging and routing of calls. In addition, these intelligent devices may also provide enhanced features. These intelligent devices were first developed and implemented in late 1970's and early 1980's to address the inefficiencies of the then existing telephone system.

In a wire line telephone system without AIN capabilities, central offices (CO), described below, are interconnected by trunk lines. Trunk lines provide for voice and/or data communication, including for example, telephone calls between telephone users or data between fax machines. However, the COs also use the trunk lines to signal each other for messaging and routing information, as well as for communication. The COs use multifrequency signaling that occupies bandwidth on the trunk lines, which could otherwise be used for communication. The term "communication" or "call" is used herein to include messages that may be exchanged between a calling party and a called party over a telephone system.

In a wire line telephone system with AIN capabilities, intelligent devices are included in the telephone system to perform messaging and routing without using the trunk lines, thereby allowing more communication over the trunk lines. Additionally, because these intelligent devices are programmable, they provide the ability for enhanced features. These intelligent devices are interconnected to the COs and are described more fully in U.S. Pat. No. 5,701, 301, which is incorporated herein by reference in its entirety. In an AIN wire line telephone system, COs are replaced with service switching point (SSP) central offices, which are central offices that include intelligent network functionality, for allowing the central offices to communicate with the intelligent devices. Preferably, an AIN system with at least AIN Release 0.2 and advanced intelligent network capabilities may be utilized to implement the various features and aspects of the invention.

Figure 1:
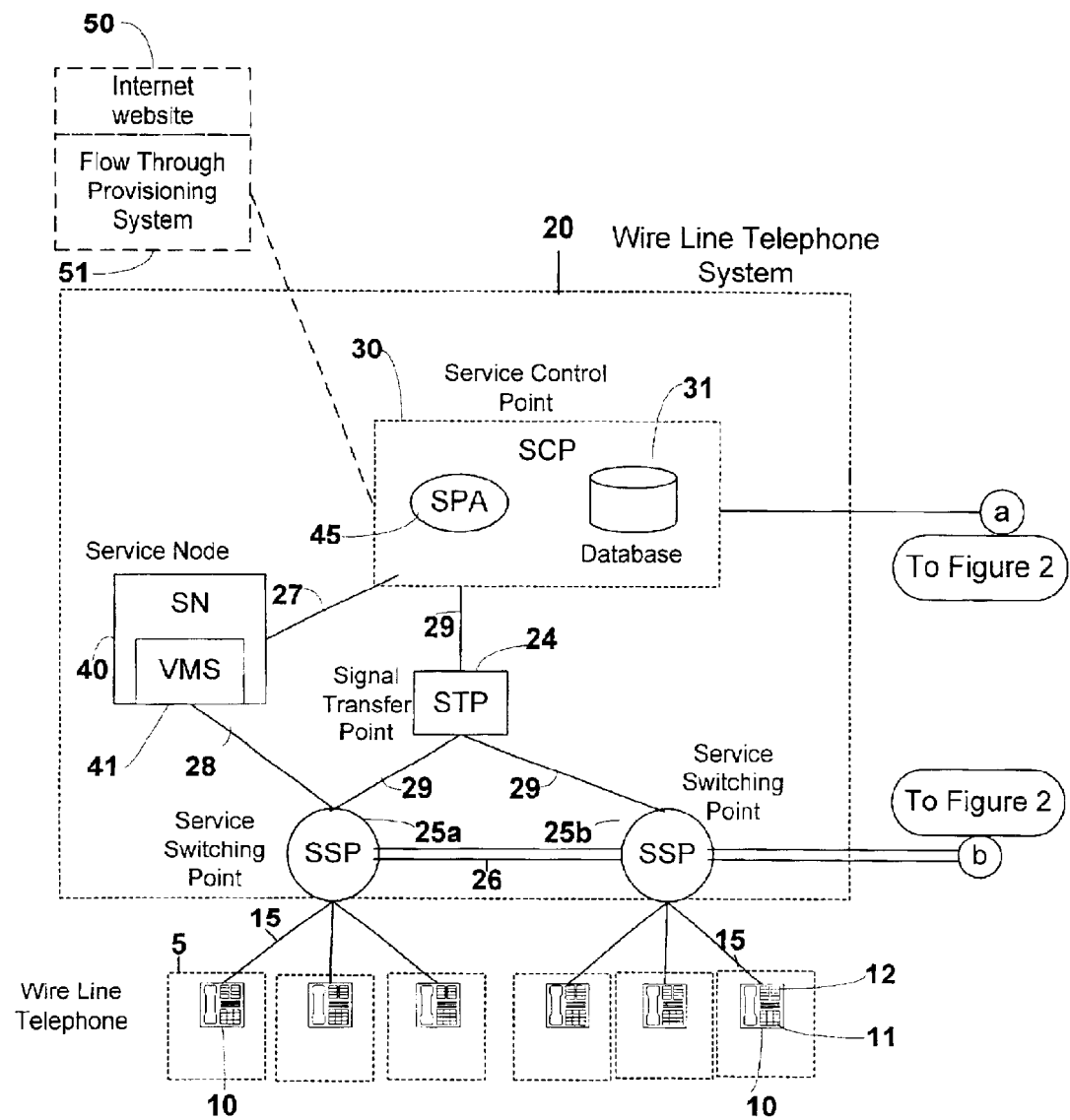
FIG. 1 is a general block diagram of an exemplary Advanced Intelligent Network (AIN) based wire line system for implementing intelligent network management features in accordance with the present invention.

FIG. 1 is a general block diagram of an exemplary AIN based wire line system for implementing intelligent network management features in accordance with the present invention. As shown in FIG. 1, an AIN wire line telephone system 20 includes at least one service control point (SCP) 30, at least one signal transfer point (STP) 24, at least one service switching point central office (SSP), shown as 25*a*, 25*b* (commonly referred to hereinafter as 25), and a plurality of subscriber locations 5. Optionally, the wire line telephone system 20 may include at least one service node (SN) 40.

Subscriber locations 5 include terminating equipment, which may be a wire line telephone 10. Although wire line telephones 10 are illustrated as the pieces of terminating equipment in FIG. 1, those skilled in the art will understand that such pieces include other telecommunication devices such as facsimile machines, computers, modems, etc. Wire line telephones 10 may include a telephone keypad 11 and indicating lamps 12.

Subscriber locations 5 are connected to an SSP 25 via telephone lines 15 (e.g., plain old telephone service (POTS), or similar). A telephone line 15 may also be referred to as a calling line and the terms will be used interchangeably hereinafter. Each SSP 25 serves a designated group of calling lines, and thus, the SSP 25 that serves a particular calling line may be referred to as its serving switch or local SSP 25. Alternatively, subscriber locations 5 may be connected to a private branch exchange (not shown), before connecting to an SSP 25.

Each active calling line in an AIN is assigned a ten digit calling line number. The term "calling line number" is used in its generally understood meaning to be the number which is dialed or input into the telephone keypad 11 by a calling party or source to reach a piece of terminating equipment on a calling line associated with the dialed calling line number. A calling line number is commonly referred to as a telephone number or a directory number and these terms will be used interchangeably herein. A calling line number associated with wire line telephone system 20 is referred to herein as a wire line number. A calling line number associated with a wireless telephone system (for example, wireless telephone system 100 described below with respect to FIG. 2) is referred to herein as a wireless number.

A party making a telephone call is referred to as the calling party and the party intended to be reached is referred to as the called party. The calling line number of the calling party is the calling number. The calling line number of the called party is the called number. In a typical application, when a calling party dials a called number, the SSP 25 of the calling number (e.g., the calling or originating SSP 25*a*), connects to the SSP 25 (e.g., the called or terminating SSP 25*b*) of the called number, over trunk lines 26. The SSP 25 of the calling number rings the wire line telephone 10 of the called number.

A telephone call may result in several statuses. A busy status occurs when the called party's line is busy. For example, the called party may currently be using the telephone. A no-answer status occurs when there is no answer on the called party's line after a predetermined time. For example, the called party may not be near the telephone 10 to answer. Alternatively, if the called party has forwarded their calls to a second telephone, a no-answer status will occur if there is no answer on the second telephone. Also, in a wireless telephone system 100 the called party may not answer the telephone 110 or the telephone 110 may be turned off. An answer status occurs when the calling party answers the telephone, for example, by taking the telephone 10 off-hook in response to receiving a telephone call. The predetermined time is a programmable time. Ideally the time is programmed to trigger a no-answer status before an answering machine or a voice messaging system answers the call. If however, an answering machine or voice messaging system answers a call, an answer status will occur.

The SSPs 25 are each programmable switches which recognize AIN-type calls, launch queries to intelligent devices in the AIN, receive commands and data from the intelligent devices within the AIN to further process and route calls, and can be configured with triggers (more fully described below) to initiate AIN actions.

SSPs 25 are also connected to another type of AIN element referred to as an STP 24 via respective data links 29. Currently, these data links 29 employ a signaling protocol referred to as Signaling System 7 (SS7), which is well known to those skilled in the art and described in a specification promulgated by the American National Standards Institute (ANSI). The SS7 protocol is a layered protocol, which employs data packets, synonymously referred to as packets, information packets, message packets, or messages. A data packet includes a beginning header, an ending header, and error checking bits.

STPs 24 perform messaging and routing functions between the SSPs 25 and the SCP 30 on an AIN network. Each SSP 25 is directly connected to an STP 24, which is its local STP 24. Each STP 24 may be connected to several SSPs 25. If an SSP 25 sends a message to another intelligent device on the AIN, the SSP 25 will first send the message to its local STP 24. STP 24 will read the message and determine where to route the message. Typically, the STP 24 will send the message to the SCP 30. The SCP 30 will then process the message and send a reply message to the appropriate STP 24. The STP 24 will then read the reply message and send that reply message to the appropriate SSP 25.

Much of the intelligence of the AIN resides in SCP 30, which includes a database 31, and is connected to STP 24 over data link 29. Typically, the SCP 30 is also the repository of service package applications (SPA) 45 that are used in connection with or as part of the database 31 in the application of telecommunication services or enhanced features to calling lines. SPAs 45 reside on SCP 30 and provide the programmable device with intelligence to process calls and queries sent from SSPs 25 and other AIN devices. An SCP 30 receives messages from devices within the wire line telephone network 20, processes the messages according to an SPA 45, and returns a reply message to the appropriate device in the network 20. The messages may include routing requests and/or enhanced features. An example of an enhanced feature available from a SPA 45 is caller identification. In caller identification, the called party receives the identification (e.g., the calling number) of the calling party along with the call. A telephone user may subscribe to an enhanced feature available in the AIN.

The AIN may also include an SN 40, which is an interactive data system that may act as a switch to transfer calls, recognize telephone keypad inputs and voice commands, provide voice synthesis, and/or store messages. SN 40 includes both voice and dual tone multi-frequency (DTMF) signal recognition devices and voice synthesis devices and therefore can respond to both voice commands and telephone keypad 11 commands. In addition, SN 40 may include a data assembly interface and a data storage device.

The data storage device may be used to store audio messages. The SN 40 may provide interactive help, collect voice information from calls, track calls, and provide indication, announcement, and messaging functions.

SN 40 is connected to the SCP 30 over data link 27. This connection is typically accomplished with an X.25 protocol or TCP/IP. In addition, SN 40 typically is connected to one or more SSPs 25 via Integrated Service Digital Network (ISDN) data links as shown by the data link 28 between SSP 25a and SN 40.

In order to keep the processing of data and calls as simple as possible, a relatively small set of triggers may be defined for each SSP 25. Specific triggers may also be defined for each calling line number. A trigger is an event that generates a message to be sent to a device within the AIN. For example, the trigger may cause the SSP 25 to send a query message to the SCP 30 requesting instructions to process the call. SCP 30 may then query its database 31 for processing instructions with respect to a particular call. The results of the database inquiry are sent back to the SSP 25 in a response from the SCP 30 through STP 24. The return message may include call processing instructions to the SSP 25. The instructions may command the SSP 25 to take some special action as a result of a customized calling service or enhanced feature, for example, forwarding a call to a voice messaging system. In response, the SSP 25 may move through its call states, collect telephone keypad inputs, generate further messages, or route calls to complete the command issued by the SCP 30.

Various triggers can by configured for each calling line number or for each SSP 25. Triggers may be configured to affect either the calling party or the called party, or both. For example, an Off-hook Trigger may be set on the calling number. If this trigger is set, the SSP 25 initiates a query to the SCP 30 every time that calling number line is taken off-hook. The SCP 30 then processes the information to determine how the call should be processed and replies to SSP 25 with instructions on how the call should be processed. Alternatively, a trigger may be set on the called line number which will trigger an AIN message to be sent. One skilled in the art of AIN applications will understand the various triggers available in a particular AIN system.

An Internet website 50 or other remote data store or network may be connected to the wire line telephone system 20 via a flow through provisioning system 51. The Internet is a vast network of interconnected computers communicating over a collection of networks, including Arpanet, NSFnet, regional networks such as NYsernet, local networks at a number of university and research institutions, and a number of military networks. The protocols generally referred to as TCP/IP were originally developed for use through Arpanet and have subsequently become widely used in the industry. The protocols provide a set of services that permit users to communicate with each other across the entire Internet. The specific services that these protocols provide include file transfer, remote log-in, remote execution, remote printing, computer mail, and access to network file systems. A flow through provisioning system 51 may be used to pass the data from the Internet to the SCP 30. In this manner, a user may access an Internet website through any conventional method, for example, dial up through a modem, which can in turn communicate with the wire line telephone system 20.

Wireless Overview

Figure 2:
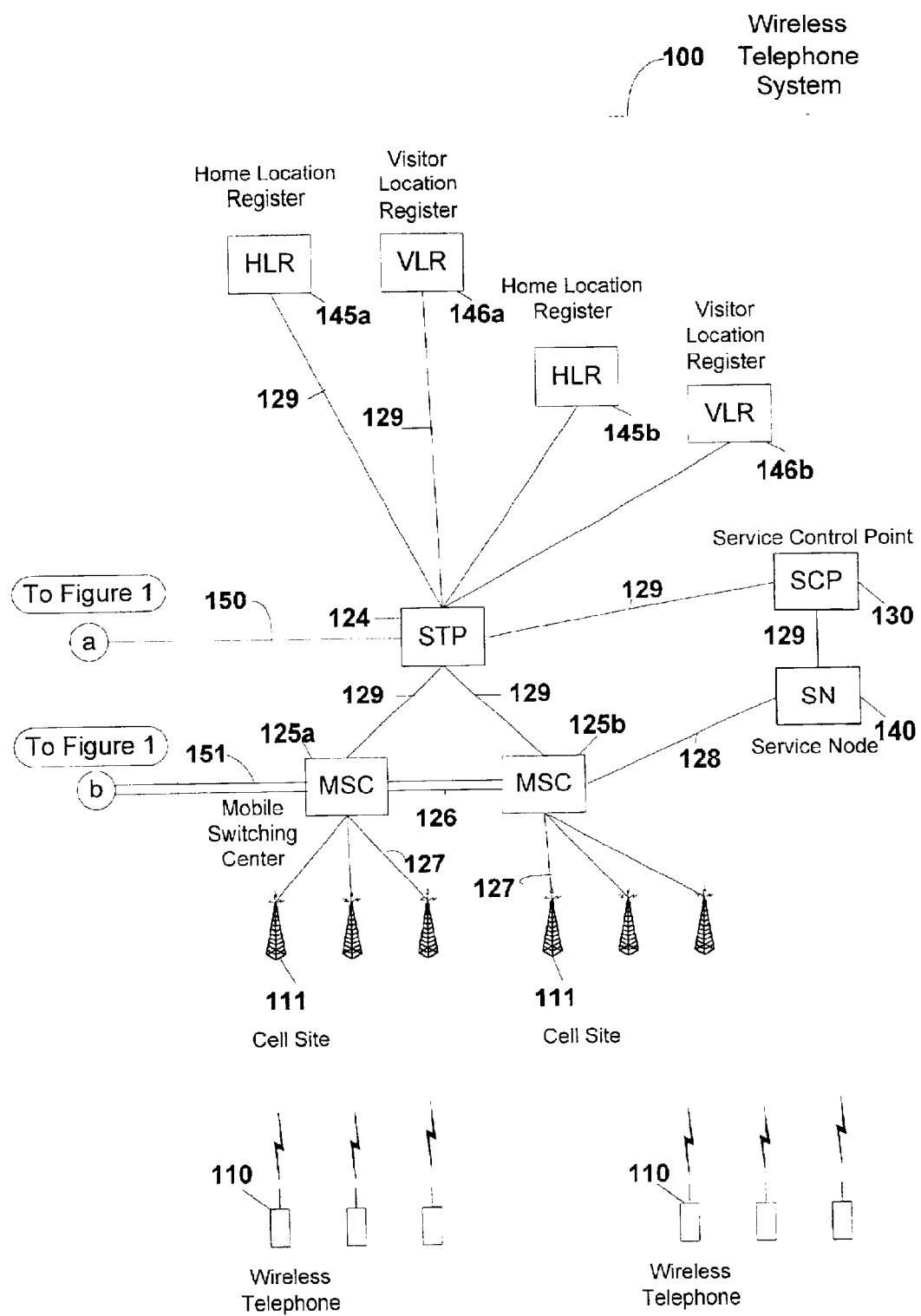
FIG. 2 is a general block diagram of an exemplary wireless telephone system for implementing intelligent network management features in accordance with the present invention.

FIG. 2 illustrates, in a general block diagram form, a wireless telephone system 100 for implementing intelligent network management features, in accordance with the present invention. As shown in FIG. 2, a wireless telephone system 100 includes a plurality of wireless phones 110, a plurality of cell sites 111, at least one mobile switching center (MSC) shown as 125a and 125b (commonly referred to as 125), a plurality of home location registers (HLR) shown as 145a and 145b (commonly referred to as 145), and a plurality of visitor location registers (VLR) shown as 146a and 146b (commonly referred to as 146), wherein each MSC 125 has an associated HLR 145 and a VLR 146. Preferably, the wireless telephone system 100 includes a signal transfer point (STP) 124.

Wireless telephones 110 communicate with cell sites 111. Each cell site 111 covers a particular geographic region called a cell, including overlap between the cell sites. These cell sites 111 are located to maximize the geographic area that wireless telephone users have to access the wireless telephone system 100. Cell sites 111 may include sending capability and/or receiving capability. Each cell site 111 has a limited number of speech (i.e., data) channels available for communication and at least one control channel for sending and receiving messaging and routing commands. The wireless telephone 110 may request a speech channel from the cell site 111 by sending a message over a control channel. The cell site 111 may or may not grant the request depending on current speech channel occupancy.

After a wireless telephone 110 has been granted a speech channel, as that a wireless telephone 110 moves from one cell site 111 to another cell site 111, the MSC 125 tracks that move and allows the wireless telephone 110 to maintain communications with the wireless telephone system 100.

MSCs 125 are interconnected by a plurality of trunk circuits 126. MSCs 125 are also connected to the wire line telephone system through at least one trunk circuit 151. MSCs 125 communicate with cell sites 111 through conventional data links 127. Preferably, base stations (not shown) are connected between the cell sites 111 and the MSCs 125.

Each wireless telephone 110 has one MSC 125 assigned as its home MSC 125. Each MSC 125 has an associated HLR 145 and a VLR 146. Each HLR 145 keeps data on each of the wireless telephones 110 assigned to that HLR 145. Included in the data residing in the HLR 145 is the on/off status of each wireless telephone 110 assigned to that HLR 145. An on-status means that the wireless telephone is in a waiting state, available to receive a call.

When a wireless telephone 110 tries to communicate with the wireless telephone system 100 through an MSC 125 that is not the user's home MSC 125, the user is still allowed access to the wireless system 100. However, in this instance, the wireless telephone 110 is considered a visiting wireless telephone 110 and is tracked and monitored by the VLR 146. The VLR 146 will report information about the visiting wireless telephone 110 to the HLR 145 assigned to that wireless telephone 110. The information includes the on/off status of the visiting wireless telephone 110.

Triggers may also be set in the wireless telephone system 100. Triggers may be set for each MSC 125 or for each wireless calling line number. The triggers in the wireless telephone system 100 operate similarly to the triggers in the wire line telephone system 20. For example, MSC 125 may request the HLR 145 for call processing instructions. The reply instructions from the HLR 145 may command the MSC 125 to take some special action as a result of a customized calling service or enhanced feature, for example, forwarding the call to a voice messaging system. In response, the MSC 125 may move through its call states, collect telephone keypad inputs, generate further messages, or route calls necessary to complete the command issued by the HLR 145.

Various triggers can by configured in the wireless telephone system 100. Triggers may be configured to affect either the calling party or the called party, or both. Triggers may be set on a per calling line number basis or on a per MSC 125 basis. One skilled in the art of wireless applications will understand the various triggers available in the wireless telephone system 100.

The wire line telephone system 20 may communicate data with the wireless telephone system 100 over a data link 150. The SCP 30 may be connected to an STP 124 in the wireless line telephone system 100. The data link 150 may be implemented with an SS7 protocol, as described above. In this manner, the SCP 30 of the wire line telephone system can communicate with any HLR 145 within the wireless telephone system 100. Alternatively, SCP 30 may be connected to each HLR 145 in the wireless telephone system 100 (not shown). Again, this data link 150 may be implemented with the SS7 protocol.

Wireless telephone system 100 may include an SCP 130 electrically connected to STP 124 over a data link 129. The SCP 130, which functions similar to SCP 30, may be used to provide enhanced features to the wireless telephone system 100. An SN 140 may be connected to the SCP 130 via a data link 129, and may be connected to a MSC (e.g., MSC 125b) via a data link 128. The SN 140, which functions similar to SN 40, may be used to provide enhanced features to the wireless telephone system 100. When intelligent devices, such as SCP 130 and/or SN 140 are added to the wireless telephone system 100, it is referred to as a wireless intelligent network (WIN).

Per Use Busy Message

Figure 3:
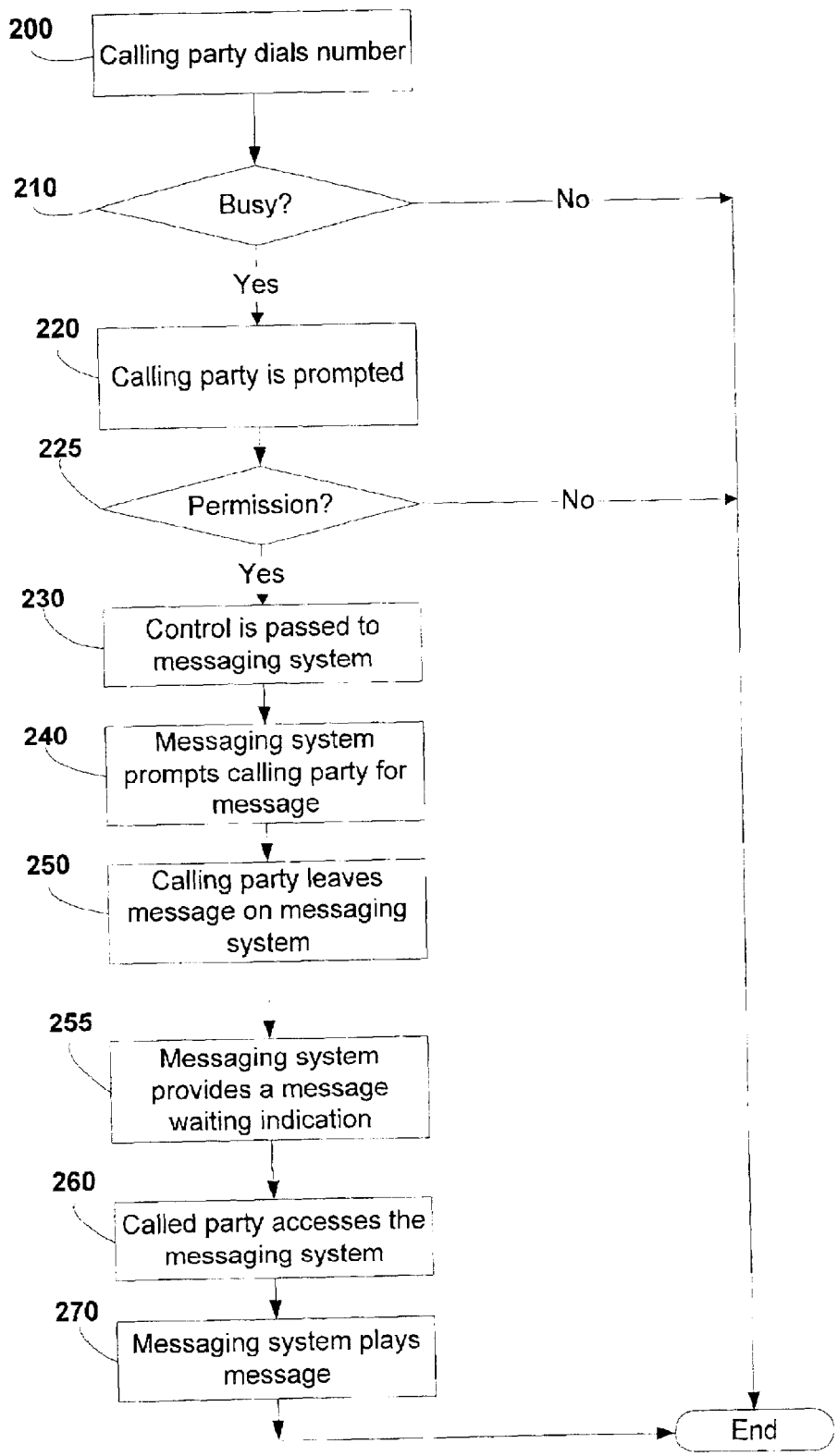
FIG. 3 is a flow diagram of an exemplary call process in accordance with the present invention.

FIG. 3 shows a flow chart of an exemplary call process of a calling party leaving a message on a voice messaging system and the called party dialing the messaging system to play the message at a later time in accordance with the present invention. In a preferred embodiment, the present invention is implemented on an AIN wire line telephone system 20 and the original call has been made on a wire line telephone 10, though it is understood that the originating call can be made from any telephone to any other telephone, in any type of intelligent telephone system.

As shown in FIG. 3, at step 200, a calling party takes his wire line telephone 10 off-hook and dials the called number associated with the called party, also referred to herein as the originally dialed number. An intelligent device in the telephone system 20 receives the called number, for example, SSP 25a shown in FIG. 1.

At step 210, if the called number has a busy status, the exemplary system is triggered to prompt the calling party for permission to send the message, at step 220. For example, an AIN trigger fires, which prompts an AIN device to prompt the calling party for permission to send the message, at step 220. In this preferred embodiment, the AIN trigger is set on the local SSP 25 of the called line number, for example, SSP 25b shown in FIG. 1. Otherwise, if the called number does not have a busy status, the call is processed in a conventional manner, such as for example, providing a continuous ringing signal to the calling party.

At step 220, the calling party is prompted for permission to send the message. In the preferred embodiment, the SSP 25 that was triggered sends a query to the SCP 30. The SCP 30 then commands the SSP 25 of the calling party to prompt the calling party for permission to send the message and receive a permission selection. Preferably, the prompt is voice synthesis. For example, the SSP 25 may prompt the calling party for permission selection (e.g., "Would you like to send a message to [the called party]?" Say "yes" or press "1" to send a message. Say "no" or press "2" to reject this option"). SSP 25 may receive permission selection input from the calling party through either telephone keypad 11 entry or voice recognition and processing techniques, for example. The calling party may select to give permission, for example by saying "yes" or pressing "1". The calling party may select to not give permission, for example, by saying "no" or pressing "2". The SSP 25 will reply to the SCP 30 for further processing instructions.

Preferably, the calling party is a customer of the local service provider. In this manner, billing to the calling party is simplified. Preferably, the SCP 30 determines if the calling party is a customer of the local service provider. In this preferred embodiment, the SCP 30 receives the query from the SSP 25 and a SPA 45 determines whether the calling party is a customer of the local service provider. The SPA 45 may determine that the calling party is a customer by analyzing information contained in the query message or by analyzing information contained in its database 31. Preferably, this is determined by comparing the calling party's telephone number to a list of telephone numbers representing the customers of the local service provider, referred to as the customer list. If the calling party's telephone number is in the customer list, then the party is a customer. Preferably, the customer list resides in the database 31. The present invention may end call processing if the calling party is not a customer.

At step 225, the system determines how to process the call depending on whether the calling party has given permission to send a message. If the calling party has given permission, the call is processed according to the present invention and proceeds to step 230. If the calling party has not given permission, the call is processed as a conventional call, such as for example, providing a busy signal to the calling party.

At step 230, control is passed to the voice messaging system. In this preferred embodiment, SCP 30 sends a message to the SSP 25 commanding it to connect to the SN 40 and to begin processing the call. SN 40 connects to the calling line through local SSP 25a. Since SN 40 may not be connected to every SSP 25 in a wire line telephone system, SN 40 may connect to the SSP 25 of the calling line via other SSPs 25.

At step 240, the exemplary system prompts the calling party for a message. Preferably, the prompt is audible voice notification. Alternatively, the prompt may be through audible tones, and/or through other indicators such as a lamp. The calling party may choose to either leave a message or to end the call processing (not shown). The calling party may select the option to leave a message through either telephone keypad 11 entry or through voice recognition and processing techniques, for example. If the calling party selects not leaving a message, the call processing ends (not shown).

At step 250, the calling party provides a message into their wire line telephone 10 and the system receives and stores the message. In the preferred embodiment, SN 40 receives the message and records the message into a data storage device. Preferably the data storage device is included in SN 40. Preferably, at the end of the message the SN 40 prompts the calling party with "message prompts" for message options. Message options may include reviewing the message, deleting the message, re-recording the message, and/or sending the message.

At this point, the voice messaging system is storing a message for the called party. At step 255, the messaging system provides a message waiting indication. In this manner, the called party is then provided with an indication that a message is waiting for him. The indication can be any indicator such as a lighted lamp or a stutter dial tone. Responsive to receiving the indication, the called party can access the voice messaging system to retrieve the message from the calling party.

More particularly, after receiving the message waiting indication, at step 260, the called party dials the voice messaging system and the system receives the call from the called party. In the preferred embodiment, the called party dials the SN 40 and is connected to the SN 40. Preferably, the SN 40 has one calling line number to dial, but a plurality of calling lines available for users. It is contemplated that the called party may remotely access the voice messaging system, from any telephone, by dialing the voice messaging system and providing information such as, for example, his/her telephone number and a password.

At step 270, the messaging system plays the message for the called party either immediately upon connecting with the called party, or upon receiving a command from the called party. The command from the called party can be received responsive to a query from the messaging system to the called party. In the preferred embodiment, the SN 40 plays the message for the called party.

In an alternate embodiment, at step 220, the calling party is prompted for permission to send the message. In this alternate embodiment, the SSP 25 that was triggered sends a query to the SCP 30. The SCP 30 then routes the call to the SN 40. The SN 40 prompts the calling party for permission to send the message and receive a permission selection. Preferably, the prompt is voice synthesis. For example, the SN 40 may prompt the calling party for permission selection (e.g., "Would you like to send a message to [the called party]?" Say "yes" or press "1" to send a message. Say "no" or press "2" to reject this option"). SN 25 may receive permission selection input from the calling party through either telephone keypad 11 entry or voice recognition and processing techniques, for example. The calling party may select to give permission, for example by saying "yes" or pressing "1". The calling party may select to not give permission, for example, by saying "no" or pressing "2". The SSP 25 will reply to the SCP 30 for further processing instructions.

In an alternate embodiment, the calling line is a wireless telephone 110. Preferably, in this embodiment the wireless telephone system 100 is a wireless intelligent network (WIN). The proper triggers are configured in the wireless telephone system 100 so that the embodiment operates similar to the above described embodiments originating in the wire line telephone system 20. The SCP 130 and the SN 140 in the wireless telephone system 100 are adapted analogously to the SCP 30 and the SN 40 in the wire line telephone system 20.

Therefore, in accordance with the present invention, a calling party can dial a called number, and upon receiving a busy status, the calling party can leave a message in a voice messaging system if the calling party has given permission to send the message, i.e., the calling party is willing to pay to leave a message. The voice messaging system receives and stores the message for future retrieval by the called party. The called party can then dial the messaging system to play the message. However, the called party does not establish the voice messaging system for his associated number, rather the calling party provides permission to send the message from the voice messaging system. In this manner, the called party can avoid a monthly subscription fee to a voice messaging system and the calling party is allowed to choose to pay on a per use basis, or other basis, for leaving a message.

It should be noted that the implementation of the present invention is not limited to AIN based networks, and other advanced or intelligent networks and arrangements may be used to implement the invention.

The invention may be embodied in the form of appropriate computer software or in the form of appropriate hardware or a combination of appropriate hardware and software without departing from the spirit and scope of the present invention. Further details regarding such hardware and/or software should be apparent to the relevant general public. Accordingly, further descriptions of such hardware and/or software herein are not believed to be necessary.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A system for receiving a message from a calling party associated with a telephone with a calling line number associated with a first service switching point and providing said message to a called party associated with a telephone with a called line number, comprising:

a second service switching point connected to said telephone with said called line number, said second service switching point comprising a trigger responsive to a busy status on said called line number and said called line number is not subsscribed to any voice messaging system;

a signal transfer point adapted to communicate with said second service switching point;

a service control point adapted to communicate with said signal transfer point, said service control point containing a database; and a service node connected to said service switching point through a first data link, and connected to said service control point through a second data link;

wherein said second service switching point sends a query to said service control point responsive to said trigger, said service control point commands one of said service node and said first service switching point to prompt for permission to leave a message from said telephone with said calling line number, said service node is adapted to receive said message from said calling party into a voice messaging system when said called line number has a busy status, store said message, and deliver said message to said called party responsive to a request from said called party if one of said service node and said first service switching point receives permission to leave a message from said telephone with said calling line number, and wherein the calling party is billed for delivering said message to said called party.

2. The system of claim 1 wherein said request from said called party is a call from said called line number to said voice messaging system.

3. The system of claim 1 further comprising a message waiting indication to said called party.

4. The system of claim 1 further comprising a third data link connected to said signal transfer point and adapted to communicate with a wireless telephone system.

5. The system of claim 1 wherein said service node is adapted to determine whether said calling party has granted permission to send said message.

6. The system of claim 1 wherein said service switching point is adapted to determine whether said calling party has granted permission to send said message.

7. The system of claim 1 wherein said service node is adapted to receive a predetermined input from said telephone of said calling party indicating that said message is forthcoming.

8. The system of claim 1 wherein said service node is adapted to prompt said calling party for said message.

9. The system of claim 1 wherein said service node comprises said voice messaging system.

10. The system of claim 1 wherein said service node is adapted to prompt said calling party with at least one message option.

11. The system of claim 10 wherein said prompt comprises audible voice notification.

12. The system of claim 1 wherein said service node is adapted to receive at least one message option from said calling party via one of either telephone keypad entry and voice recognition.

13. A system for receiving a message from a calling party associated with a telephone with a calling line number associated with a first mobile switching center and providing said message to a called party associated with a wireless telephone with a called line number, comprising:

a second home location register adapted to communicate with a mobile switching center; said second mobile switching center adapted to communicate with a plurality of cell sites, said second mobile switching center comprising a trigger responsive to a busy status on said called line number and wherein said called party is not a customer of said voice messaging system;

said plurality of cell sites adapted to communicate with a plurality of wireless telephones;

a signal transfer point adapted to communicate with said mobile switching centers and said home location registers;

a service control point adapted to communicate with said signal transfer point; and a service node adapted to communicate with said signal transfer point and to communicate with said second mobile switching center;

wherein said second mobile switching center sends a query to said service control point responsive to said trigger, said service control point commands said service node to prompt for permission to leave a message from said telephone with said calling line number, said service node is adapted to receive said message from said calling party into a voice messaging system when said called line number has a busy status, store said message, and deliver said message to said called party responsive to a request from said called party if one of said service node and said first mobile switching center receives permission to leave a message from said telephone with said calling line number, and wherein the calling party is billed for delivering said message to said called party.

14. The system of claim 13 wherein said request from said called party is a call from said called line number to said voice messaging system.

15. The system of claim 13 further comprising a message waiting indication to said called party.

16. The system of claim 13 further comprising a data link connected to said signal transfer point and adapted to communicate with a wire line telephone system.

17. A method for delivering a message from a calling party associated with a telephone with a calling line number associated with a first service switching point to a called party associated with a telephone with a called line number on a wire line telephone system comprising a messaging system and a second service switching point associated with said telephone with the called line number, wherein a trigger responsive to a busy status of said called line number is set on said second service switching point of said called line number, said first and second service switching points being in communication with a service node and a service control point, said method comprising:

triggering, in response to a no-answer status of said called line number, said second service switching point to request call processing information from said service control point while said called line number is not subscribed to any voice messaging system;

commanding, by said service control point, one of said service node and said first service switching point to prompt for permission to leave a message from said telephone with the calling line number; and if permission is received at one of said service node and said first service switching point:

receiving said message at said messaging system, said message being sent from said calling party after determining that said called line number has a busy status;

storing said message in said messaging system; and delivering said message to said called party responsive to a request, wherein said called party is not a customer of said messaging system, and wherein the calling party is billed for delivering said message to said called party.

18. The method of claim 17 further comprising activating a message waiting indication to alert said called party that said message is stored in said messaging system.

19. The method of claim 17 further comprising determining whether said calling party has granted permission to send said message.

20. The method of claim 17 further comprising prompting said calling party for said message after determining that said called line number has a busy status.

21. The method of claim 20 wherein said prompting for said message comprises prompting with audible voice notification.

22. The method of claim 17 further comprising prompting said calling party for at least one message option after receiving said message from said calling party, and thereafter receiving said selected at least one message option from said calling party.

23. The method of claim 22 wherein said prompting for at least one message option comprises prompting with audible voice notification.

24. The method of claim 22 wherein said receiving at least one message option comprises receiving at least one message option via one of either telephone keypad entry and voice recognition.

25. The method of claim 17 wherein delivering said message further comprises sending said message to said called party at said called line number when said called line number dials and connects to said messaging system.

26. The method of claim 17 further comprising determining if said calling party is a customer, and only if so, receiving said message from said calling party.

27. The method of claim 26 wherein determining if said calling party is a customer comprises comparing said calling party to a predetermined plurality of authorized calling parties.

28. The method of claim 17 further comprising prior to receiving said message, dialing said called line number and determining if a busy status is received, and if so, prompting said calling party for said message.

29. The method of claim 17 further comprising receiving said request for said message from said called party prior to delivering said message to said called party.

30. A method for delivering a message from a calling party associated with a telephone with a calling line number with a first mobile switching center to a called party associated with a telephone with a called line number on a wireless telephone system comprising a messaging system and a second mobile switching center associated with said telephone with the called line number, wherein a trigger responsive to a busy signal is set on said mobile switching center of said called line number, said first and second mobile switching centers being in communication with a service node and a service control point, said method comprising:
  triggering, in response to a no-answer status of said called line number, said second mobile switching center to request call processing information from said service control point while said called line number is not subscribed to any voice messaging system;
  commanding, by said service control point, said service node to prompt for permission to leave a message from said telephone with the calling line number; and if permission is received at one of said service node and said first mobile switching center:
    receiving said message at said messaging system, said message being sent from said calling party after determining that said called line number has a busy status;
    storing said message in said messaging system; and
    delivering said message to said called party responsive to a request, wherein said called party is not a customer of said messaging system, and wherein the calling party is billed for delivering said message to said called party.

31. The method of claim 30 further comprising receiving said request from said called party requesting said message.

32. The method of claim 30 further comprising determining if said calling party is a customer, and only if so, receiving said message from said calling party.

33. The method of claim 30 further comprising prompting said calling party for said message.

34. The method of claim 30 further comprising prior to receiving said message from said calling party, dialing said called line number and determining if a busy status is received, and if so, prompting said calling party for said message.

35. The method of claim 30 further comprising activating a message waiting indication to alert said called party that said message is stored in said voice messaging system.

36. A system-readable medium for delivering a message from a calling party associated with a telephone with a calling line number associated with a first service switching point to a called party associated with a telephone with a called line number on a wire line telephone system comprising a messaging system and a second service switching point associated with said telephone with the called line number, wherein a trigger responsive to a busy status of said called line number is set on said second service switching point of said called line number, said first and second service switching points being in communication with a service node and a service control point, said system-readable medium having instructions thereon, the instructions when executed on a system causing the system to perform:
  triggering, in response to a no-answer status of said called line number, said second service switching point to request call processing information from said service control point while said called line number is not subscribed to any voice messaging system;
  commanding, by said service control point, one of said service node and said first service switching point to prompt for permission to leave a message from said telephone with the calling line number; and if permission is received at one of said service node and said first service switching point:
    receiving said message at said messaging system, said message being sent from said calling party after determining that said called line number has a busy status;
    storing said message in said messaging system; and
    delivering said message to said called party responsive to a request, wherein said called party is not a customer of said messaging system, and wherein the calling party is billed for delivering said message to said called party.

37. The system-readable medium of claim 36 wherein the instructions further cause the system to perform activating a message waiting indication to alert said called party that said message is stored in said messaging system.

38. The system-readable medium of claim 36 wherein the instructions further cause the system to perform determining whether said calling party has granted permission to send said message.

39. The system-readable medium of claim 36 wherein the instructions further cause the system to perform prompting said calling party for said message after determining that said called line number has a busy status.

40. The system-readable medium of claim 36 wherein the instructions further cause the system to perform prompting said calling party for at least one message option after receiving said message from said calling party, and thereafter receiving said selected at least one message option from said calling party.

41. The system-readable medium of claim 36 wherein delivering said message further comprises sending said message to said called party at said called line number when said called line number dials and connects to said messaging system.

42. The system-readable medium of claim 36 wherein the instructions further cause the system to perform determining if said calling party is a customer, and only if so, receiving said message from said calling party.

43. A system-readable medium for delivering a message from a calling party associated with a telephone with a calling line number with a first mobile switching center to a called party associated with a telephone with a called line number on a wireless telephone system comprising a messaging system and a second mobile switching center associated with said telephone with the called line number, wherein a trigger responsive to a busy signal is set on said mobile switching center of said called line number, said first and second mobile switching centers being in communication with a service node and a service control point, said system-readable medium having instructions thereon, the instructions when executed on a system causing the system to perform:

triggering, in response to a no-answer status of said called line number, said second mobile switching center to request call processing information from said service control point while said called line number is not subscribed to any voice messaging system;

commanding, by said service control point, said service node to prompt for permission to leave a message from said telephone with the calling line number; and if permission is received at one of said service node and said first mobile switching center:

receiving said message at said messaging system, said message being sent from said calling party after determining that said called line number has a busy status;

storing said message in said messaging system; and delivering said message to said called party responsive to a request, wherein said called party is not a customer of said messaging system, and wherein the calling party is billed for delivering said message to said called party.

44. The system-readable medium of claim 43 wherein the instructions further cause the system to perform receiving said request from said called party requesting said message.

45. The system-readable medium of claim 43 wherein the instructions further cause the system to perform determining if said calling party is a customer, and only if so, receiving said message from said calling party.

46. The system-readable medium of claim 43 wherein the instructions further cause the system to perform prompting said calling party for said message.

47. The system-readable medium of claim 43 wherein the instructions further cause the system to perform prior to receiving said message from said calling party, dialing said called line number and determining if a busy status is received, and if so, prompting said calling party for said message.

48. The system-readable medium of claim 43 wherein the instructions further cause the system to perform activating a message waiting indication to alert said called party that said message is stored in said voice messaging system.

* * * * *